(12) United States Patent
Matsubara et al.

(10) Patent No.: US 10,161,514 B2
(45) Date of Patent: Dec. 25, 2018

(54) CONTROL APPARATUS FOR LOCKUP CLUTCH

(71) Applicant: TOYOTA JIDOSHA KABUSHIKI KAISHA, Toyota-shi, Aichi-ken (JP)

(72) Inventors: Keigo Matsubara, Nagoya (JP); Hironobu Aratake, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 15/588,893

(22) Filed: May 8, 2017

(65) Prior Publication Data

US 2017/0328467 A1 Nov. 16, 2017

(30) Foreign Application Priority Data

May 12, 2016 (JP) ................... 2016-096233

(51) Int. Cl.
| | |
|---|---|
| *F16H 61/14* | (2006.01) |
| *F16D 48/06* | (2006.01) |
| *F16H 45/02* | (2006.01) |
| *B60W 10/02* | (2006.01) |
| *F16H 59/18* | (2006.01) |
| *F16H 59/14* | (2006.01) |

(52) U.S. Cl.
CPC ......... *F16H 61/143* (2013.01); *B60W 10/026* (2013.01); *F16D 48/06* (2013.01); *F16H 45/02* (2013.01); *F16D 2500/10412* (2013.01); *F16D 2500/3144* (2013.01); *F16D 2500/50287* (2013.01); *F16H 59/18* (2013.01); *F16H 2059/144* (2013.01); *F16H 2061/145* (2013.01)

(58) Field of Classification Search
CPC .. F16H 61/14; F16H 61/143; F16H 2061/145; F16H 2061/147; F16H 59/18; F16H 59/14; F16H 2059/186; F16H 2059/144; B60W 10/023
See application file for complete search history.

(56) References Cited

U.S. PATENT DOCUMENTS 6,049,752 A    4/2000  Katakura et al.
6,637,566 B2 * 10/2003 Takatori ............... F16H 61/143
                                                192/3.3

FOREIGN PATENT DOCUMENTS

JP         2010-038300 A      2/2010

* cited by examiner

*Primary Examiner* — Erin D Bishop
(74) *Attorney, Agent, or Firm* — Oliff PLC

(57) ABSTRACT

A control apparatus for a lockup clutch is provided. The control apparatus for the lockup clutch includes an electronic control unit that is configured to: calculate a driven target clutch torque capacity and a driving target clutch torque capacity; set a target clutch torque of the lockup clutch and control the lockup clutch, based on the driven target clutch torque capacity and the driving target clutch torque capacity; and change over the target clutch torque capacity from the driven target clutch torque capacity to the driving target clutch torque capacity when the driven target clutch torque capacity and the driving target clutch torque capacity coincide with each other after an operation state of an accelerator of the vehicle changes over from an accelerator OFF state to an accelerator ON state.

5 Claims, 12 Drawing Sheets

FIG. 2

|     | C1 | C2 | C3 | C4 | B1 | B2 |
|-----|----|----|----|----|----|----|
| 1st | O  | —  | —  | —  | —  | O  |
| 2nd | O  | —  | —  | —  | O  | —  |
| 3rd | O  | —  | O  | —  | —  | —  |
| 4th | O  | —  | —  | O  | —  | —  |
| 5th | O  | O  | —  | —  | —  | —  |
| 6th | —  | O  | —  | O  | —  | —  |
| 7th | —  | O  | O  | —  | —  | —  |
| 8th | —  | O  | —  | —  | O  | —  |
| Rev | —  | —  | O  | —  | —  | O  |

CONTROL APPARATUS FOR LOCKUP CLUTCH

INCORPORATION BY REFERENCE

The disclosure of Japanese Patent Application No. 2016-096233 filed on May 12, 2016 including the specification, drawings and abstract is incorporated herein by reference in its entirety.

BACKGROUND

1. Technical Field

The present disclosure relates to a control apparatus that is applied to a lockup clutch that is provided in a transmission for a vehicle.

2. Description of Related Art

In Japanese Patent Application Publication No. 2010-038300 (JP 2010-038300 A), there is described an art of lockup clutch control at the time of a changeover in the state of a transmission from a driven state (a state where the transmission is driven from driving wheels of a vehicle) to a driving state (a state where the transmission drives the driving wheels of the vehicle) and at the time of a changeover in the state of the transmission from the driving state to the driven state (hereinafter referred to also as the time of a driving/driven changeover).

In the art described in this Japanese Patent Application Publication No. 2010-038300 (JP 2010-038300 A), when a transition from acceleration slip control to deceleration slip control is made and the transmission is in the driven state before the transition, a lockup clutch command oil pressure at the time of the transition to deceleration slip control is temporarily increased. Thus, lockup clutch control can be appropriately performed.

SUMMARY

By the way, in lockup clutch control, at the time of a driving/driven changeover, there is a difference between a pre-changeover target clutch torque capacity and a post-changeover target clutch torque capacity (the target clutch torque capacity needed in the driven state and the target clutch torque capacity needed in the driving state are different from each other). Therefore, when the target clutch torque capacity is immediately changed over at the time of the driving/driven changeover, a shock may occur at the time of a driving/driven transition (at the time of a transition from the driven state to the driving state and at the time of a transition from the driving state to the driven state) due to a rapid change in the target clutch torque capacity.

Incidentally, the art described in the aforementioned Japanese Patent Application Publication No. 2010-038300 (JP 2010-038300 A) is effective only on a specific condition (when a transition from acceleration slip control to deceleration slip control is made and the transmission is in the driven state before the transition), and cannot cope with a problem at the aforementioned driving/driven transition (the occurrence of a shock due to a change in the target clutch torque capacity).

The present disclosure provides a control apparatus for a lockup clutch that can appropriately control the target clutch torque capacity of the lockup clutch when a transmission makes a transition from a driven state to a driving state and when the transmission makes a transition from the driving state to the driven state.

A control apparatus for a lockup clutch according to one aspect of the present disclosure is provided. The lockup clutch is provided in a transmission that is mounted in a vehicle. The control apparatus for the lockup clutch includes an electronic control unit.

The electronic control unit is configured to calculate a driven target clutch torque capacity that is needed in a driven state where the transmission is driven from driving wheels of the vehicle, and a driving target clutch torque capacity that is needed in a driving state where the transmission drives the driving wheels of the vehicle, set a target clutch torque of the lockup clutch and control the lockup clutch, based on the driven target clutch torque capacity and the driving target clutch torque capacity, change over the target clutch torque capacity from the driven target clutch torque capacity to the driving target clutch torque capacity when the driven target clutch torque capacity and the driving target clutch torque capacity coincide with each other after an operation state of an accelerator of the vehicle changes over from an accelerator OFF state to an accelerator ON state, and change over the target clutch torque capacity from the driving target clutch torque capacity to the driven target clutch torque capacity when the driving target clutch torque capacity and the driven target clutch torque capacity coincide with each other after the operation state of the accelerator changes over from the accelerator ON state to the accelerator OFF state.

With the control apparatus for the lockup clutch according to this aspect of the present disclosure, when the driven target clutch torque capacity and the driving target clutch torque capacity coincide with each other (when the difference between the driven target clutch torque capacity and the driving target clutch torque capacity disappears) after a changeover from the accelerator OFF state to the accelerator ON state, the target clutch torque capacity for use in the control of the lockup clutch is changed over from the driven target clutch torque capacity to the driving target clutch torque capacity. Therefore, the target clutch torque capacity of the lockup clutch can be appropriately controlled at the time of a transition from the driven state to the driving state. Thus, a shock can be restrained from occurring at the time of a transition from the driven state to the driving state.

Besides, when the driving target clutch torque capacity and the driven target clutch torque capacity coincide with each other (when the difference between the driving target clutch torque capacity and the driven target clutch torque capacity disappears) after a changeover from the accelerator ON state to the accelerator OFF state, the target clutch torque capacity for use in the control of the lockup clutch is changed over from the driving target clutch torque capacity to the driven target clutch torque capacity. Therefore, the target clutch torque capacity of the lockup clutch can be appropriately controlled at the time of a transition from the driving state to the driven state. Thus, a shock can be restrained from occurring at the time of a transition from the driving state to the driven state.

In the control apparatus for the lockup clutch according to the aforementioned aspect of the present disclosure, the electronic control unit may be configured to start comparing the driven target clutch torque capacity and the driving target clutch torque capacity with each other after the operation state of the accelerator changes over from the accelerator OFF state to the accelerator ON state, and change over the target clutch torque capacity from the driven target clutch torque capacity to the driving target clutch torque capacity when the driven target clutch torque capacity and the driving target clutch torque capacity coincide with each other. The electronic control unit may be configured to start comparing the driving target clutch torque capacity and the driven target clutch torque capacity with each other after the operation state of the accelerator changes over from the accelerator ON state to the accelerator OFF state, and change over the target clutch torque capacity from the driving target clutch torque capacity to the driven target clutch torque capacity when the driving target clutch torque capacity and the driven target clutch torque capacity coincide with each other.

With the control apparatus for the lockup clutch according to this aspect of the present disclosure, the control of changing over the target clutch torque capacity for use in the control of the lockup clutch from the driven target clutch torque capacity to the driving target clutch torque capacity (or the control of changing over the target clutch torque capacity for use in the control of the lockup clutch from the driving target clutch torque capacity to the driven target clutch torque capacity) is performed based on the comparison between the driven target clutch torque capacity and the driving target clutch torque capacity. Thus, lockup clutch control at the time of a transition from the driven state to the driving state (at the time of a transition from the driving state to the driven state) corresponding to the operation state of the accelerator pedal or the driving/driven state can be appropriately performed.

In the case where the change in the accelerator opening degree from a changeover from the accelerator OFF state to the accelerator ON state is small (in the case of delayed depression of the accelerator pedal), it takes a long time until the driven target clutch torque capacity and the driving target clutch torque capacity coincide with each other. In the control apparatus for the lockup clutch according to the aforementioned aspect of the present disclosure, the electronic control unit may be configured to calculate the driven target clutch torque capacity such that the driven target clutch torque capacity changes toward the driving target clutch torque capacity when the driven target clutch torque capacity and the driving target clutch torque capacity do not coincide with each other within a first predetermined time after the operation state of the accelerator changes over from the accelerator OFF state to the accelerator ON state.

With the control apparatus for the lockup clutch according to this aspect of the present disclosure, the driven target clutch torque capacity is forcibly changed toward the driving target clutch torque capacity when the first predetermined time elapses after a changeover from the accelerator OFF state to the accelerator ON state. Thus, even in the case where the change in the accelerator opening degree is small (in the case of delayed depression of the accelerator pedal), the time necessary for the control of making a changeover from the driven target clutch torque capacity to the driving target clutch torque capacity can be restrained from becoming long. Thus, a swift transition to the driving target clutch torque capacity can be made at the time of a transition from the driven state to the driving state.

Besides, when the residual engine torque after a changeover from the accelerator ON state to the accelerator OFF state is large, it takes a long time until the driving target clutch torque capacity and the driven target clutch torque capacity coincide with each other. In the control apparatus for the lockup clutch according to the aforementioned aspect of the present disclosure, the electronic control unit may be configured to calculate the driving target clutch torque capacity such that the driving target clutch torque capacity changes toward the driven target clutch torque capacity when the driving target clutch torque capacity and the driven target clutch torque capacity do not coincide with each other within a second predetermined time after the operation state of the accelerator changes over from the accelerator ON state to the accelerator OFF state.

With the control apparatus for the lockup clutch according to this aspect of the present disclosure, the driving target clutch torque capacity is forcibly changed toward the driven target clutch torque capacity when the second predetermined time elapses after a changeover from the accelerator ON state to the accelerator OFF state. Thus, even in the case where the residual engine torque is large, the time necessary for the control of making a changeover from the driving target clutch torque capacity to the driven target clutch torque capacity can be restrained from becoming long. Thus, a swift transition to the driven target clutch torque capacity can be made at the time of a transition from the driving state to the driven state.

In the control apparatus for the lockup clutch according to the aforementioned aspect of the present disclosure, the electronic control unit may be configured to change over the target clutch torque capacity from the driven target clutch torque capacity to the driving target clutch torque capacity after a third predetermined time elapses from a timing when the driven target clutch torque capacity and the driving target clutch torque capacity coincide with each other following a changeover from the accelerator OFF state to the accelerator ON state. Besides, the electronic control unit may be configured to change over the target clutch torque capacity from the driving target clutch torque capacity to the driven target clutch torque capacity after a fourth predetermined time elapses from a timing when the driving target clutch torque capacity and the driven target clutch torque capacity coincide with each other following a changeover from the accelerator ON state to the accelerator OFF state.

In the control apparatus for the lockup clutch according to the aforementioned aspect of the present disclosure, the electronic control unit may be configured to determine that the operation state of the accelerator has been changed over from the accelerator OFF state to the accelerator ON state and that the operation state of the accelerator has been changed over from the accelerator ON state to the accelerator OFF state. The electronic control unit may be configured to start comparing the driven target clutch torque capacity and the driving target clutch torque capacity with each other after it is determined that the operation state of the accelerator has been changed over from the accelerator OFF state to the accelerator ON state, and change over the target clutch torque capacity from the driven target clutch torque capacity to the driving target clutch torque capacity when the driven target clutch torque capacity and the driving target clutch torque capacity coincide with each other. The electronic control unit may be configured to start comparing the driving target clutch torque capacity and the driven target clutch torque capacity with each other after it is determined that the operation state of the accelerator has been changed over from the accelerator ON state to the accelerator OFF state, and change over the target clutch torque capacity from the driving target clutch torque capacity to the driven target clutch torque capacity when the driving target clutch torque capacity and the driven target clutch torque capacity coincide with each other.

According to the present disclosure, the target clutch torque capacity of the lockup clutch can be appropriately controlled at the time of a transition from the driven state to the driving state and at the time of a transition from the driving state to the driven state.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is an engagement chart showing engagement states of respective clutches and respective brakes in an automatic transmission shown in FIG. 1 for each gear stage;

FIG. 6 is a block showing the configuration of a control system such as an ECU and the like;

DETAILED DESCRIPTION OF EMBODIMENTS

One of the embodiments of the present disclosure will be described hereinafter based on the drawings.

Figure 1:
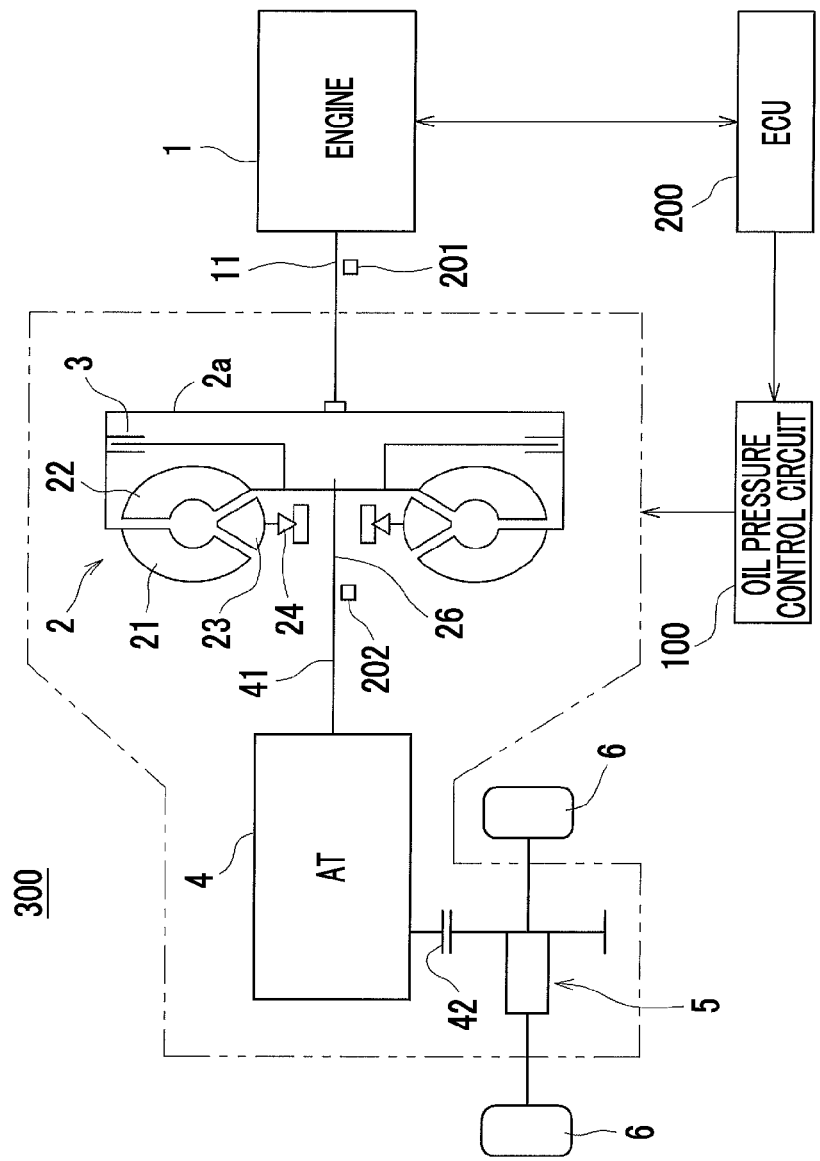
FIG. 1 is a schematic configuration view showing an exemplary vehicle that is mounted with a multiple plate lockup clutch to which the present disclosure is applied.

First of all, an exemplary vehicle that is mounted with a multiple plate lockup clutch to which the present disclosure is applied will be described with reference to FIG. 1.

A vehicle 300 of this example is a front-engine front-drive (FF) vehicle, and is equipped with an engine 1, a torque converter 2, a multiple plate lockup clutch 3, an automatic transmission (an AT) 4, a differential device 5, driving wheels (front wheels) 6, driven wheels (rear wheels: not shown), an oil pressure control circuit 100, an electronic control unit (an ECU) 200 and the like.

This engine 1, this torque converter 2, this multiple plate lockup clutch 3, this automatic transmission 4, this oil pressure control circuit 100 and respective components of this ECU 200 will be described hereinafter.

Engine—The engine 1 is a driving force source for running, for example, a multi-cylinder gasoline engine. A crankshaft 11 as an output shaft of the engine 1 is coupled to the torque converter 2. A rotational speed of the crankshaft 11 (an engine rotational speed Ne) is detected by an engine rotational speed sensor 201.

Torque Converter—The torque converter 2 is equipped with an input shaft-side pump impeller 21, an output shaft-side turbine runner 22, a stator 23 that performs a torque amplification function, and a one-way clutch 24, and transmits motive power between the pump impeller 21 and the turbine runner 22. The torque converter 2 is provided with the multiple plate lockup clutch 3 that couples an input side and an output side of the torque converter 2 to each other directly or in a slipping state. A rotational speed (a turbine rotational speed Nt) of a turbine shaft 26 of the torque converter 2 is detected by a turbine rotational speed sensor 202.

Figure 3:
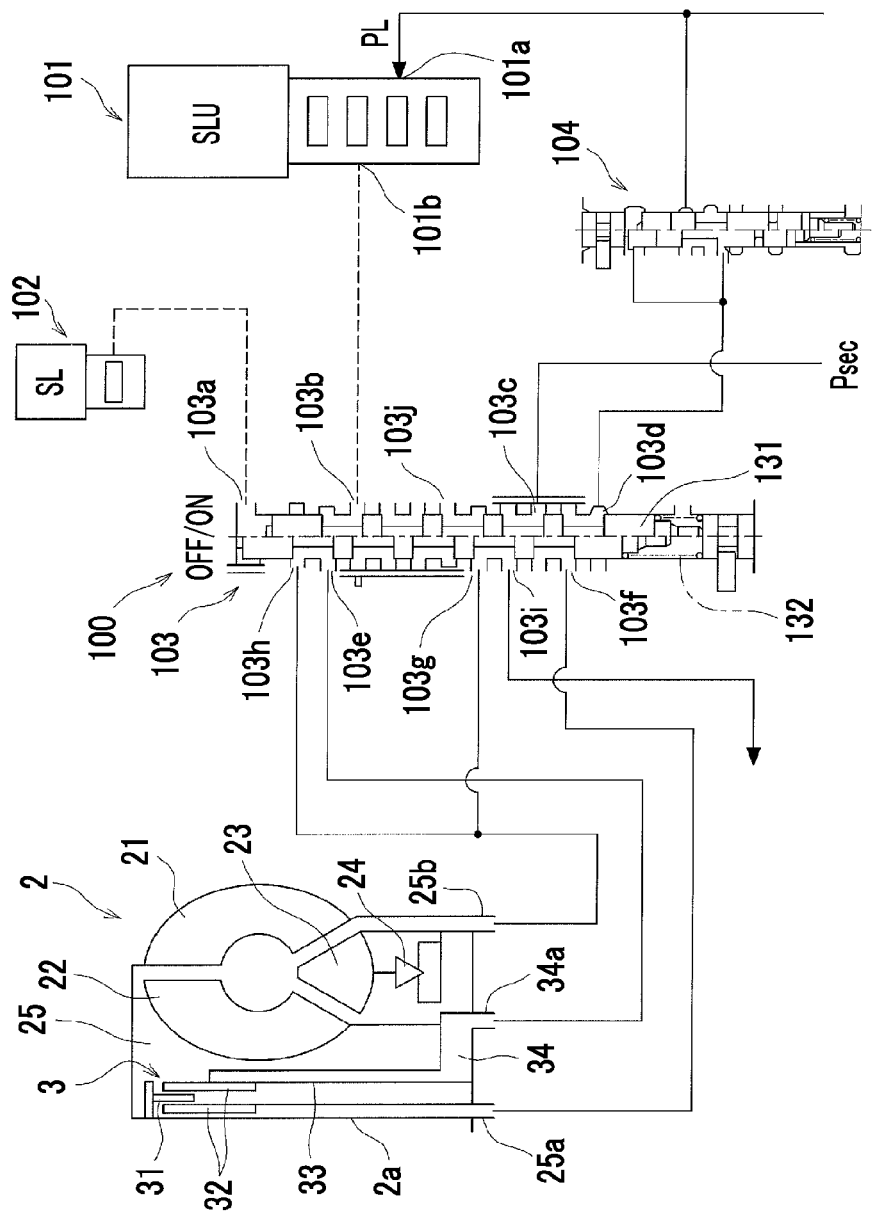
FIG. 3 is a circuit configuration view of an oil pressure control circuit.

As shown in FIG. 3, a converter oil chamber 25 for hydraulic oil circulation is formed inside the torque converter 2. The converter oil chamber 25 is provided with a T/C input port 25a for introducing hydraulic oil and a T/C output port 25b for discharging hydraulic oil.

Multiple plate lockup clutch—As shown in FIG. 3, the multiple plate lockup clutch 3 is equipped with clutch plates (frictional engagement plates) 31 and 32, and a lockup piston 33 that can press the clutch plate 31 and the clutch plates 32. The clutch plate 31 is supported slidably in an axial direction by a clutch hub that is fixed to a front cover 2a of the torque converter 2, and the clutch plates 32 are supported slidably in the axial direction by a clutch hub that is connected to the turbine runner 22. The lockup piston 33 is provided slidably in the axial direction inside the torque converter 2. A lockup oil chamber 34 is formed on a back face side of the lockup piston 33 (on the other side of the front cover 2a). The lockup oil chamber 34 is provided with an L/U input port 34a for introducing hydraulic oil (introducing an oil pressure) and discharging hydraulic oil.

Then, when an oil pressure is supplied to the lockup oil chamber 34 in the multiple plate lockup clutch 3 thus structured, the clutch plate 31 and the clutch plates 32 are engaged, so the multiple plate lockup clutch 3 assumes an engaged state (a completely engaged state or a slipping state). On the other hand, when no oil pressure is supplied to the lockup oil chamber 34, the lockup piston 33 operates toward a release side due to an elastic force exerted by a return spring (not shown), and the multiple plate lockup clutch 3 assumes a released state.

Automatic Transmission—The automatic transmission 4 (the transmission for the vehicle) is a stepped transmission, and includes a plurality of hydraulic frictional engagement elements and a planetary gear device. In the automatic transmission 4, a plurality of gear stages (shift stages) can be selectively established through selective engagement of the plurality of the frictional engagement elements. As shown in FIG. 1, an input shaft 41 of the automatic transmission 4 is coupled to the turbine shaft 26 of the torque converter 2. An output gear 42 of the automatic transmission 4 is coupled to the driving wheels 6 via the differential device 5 and the like.

As shown in, for example, FIG. 2, the automatic transmission 4 includes first to fourth clutches C1 to C4 and first and second brakes B1 and B2 as the hydraulic frictional engagement elements. By controlling the engagement and release of these four clutches C1 to C4 and these two brakes B1 and B2, eight forward gear stages (a first-speed gear stage "1st", a second-speed gear stage "2nd" to an eighth-speed gear stage "8th") and a backward gear stage (a backward gear stage "Rev") are achieved. The engagement or release of these clutches C1 to C4 and these brakes B1 and B2 is controlled by the oil pressure control circuit 100.

Oil Pressure Control Circuit—Next, the oil pressure control circuit 100 will be described with reference to FIG. 3. Incidentally, only an oil pressure control circuit configuration of the torque converter 2 and the multiple plate lockup clutch 3 is shown in FIG. 3.

First of all, although not shown in the drawings, the oil pressure control circuit 100 of this example is equipped with an oil pump, a primary regulator valve, a secondary regulator valve and the like. An oil pressure generated by the oil pump is regulated by the primary regulator valve to generate a line pressure PL. Using the line pressure PL as a source pressure, a secondary pressure Psec is regulated by the secondary regulator valve.

The oil pressure control circuit 100 shown in FIG. 3 is equipped with a linear solenoid valve (SLU) 101, a solenoid valve (SL) 102, a lockup relay valve 103, a circulation modulator valve 104 (hereinafter referred to as a Cir-MOD valve 104), and the like.

The linear solenoid valve (SLU) 101 outputs a control oil pressure, which is obtained by regulating the line pressure PL that is supplied to an input port 101*a*, from an output port 101*b* in accordance with a command (a lockup clutch command oil pressure) from the ECU 200.

The solenoid valve (SL) 102 outputs a signal pressure upon being subjected to ON control in accordance with a command from the ECU 200. The Cir-MOD valve 104 outputs a circulation modulator pressure (hereinafter referred to as a Cir-MOD pressure) obtained by regulating the line pressure PL.

The lockup relay valve 103 is a changeover valve that operates in accordance with a signal pressure from the solenoid valve (SL) 102 to change over a supply/discharge path of an oil pressure.

The lockup relay valve 103 is provided with a signal pressure input port 103*a*, an L/U pressure input port 103*b*, a secondary pressure input port 103*c* and a Cir-MOD pressure input port 103*d*. Besides, the lockup relay valve 103 is provided with an L/U pressure output port 103*e*, a T/C pressure output port 103*f*, two exhaust pressure input ports 103*g* and 103*h*, a cooling port 103*i* and an exhaust port 103*j*.

The signal pressure input port 103*a* is connected to the solenoid valve (SL) 102. The L/U pressure input port 103*b* is connected to the output port 101*b* of the linear solenoid valve (SLU) 101. The secondary pressure input port 103*c* is connected to the aforementioned secondary regulator valve. The Cir-MOD pressure input port 103*d* is connected to the Cir-MOD valve 104. The L/U pressure output port 103*e* is connected to the L/U input port 34*a* of the multiple plate lockup clutch 3. The T/C pressure output port 103*f* is connected to the T/C input port 25*a* of the torque converter 2. The exhaust pressure input ports 103*g* and 103*h* are connected to the T/C output port 25*b* of the torque converter 2. The cooling port 103*i* is connected to a cooler (not shown).

Figure 4:
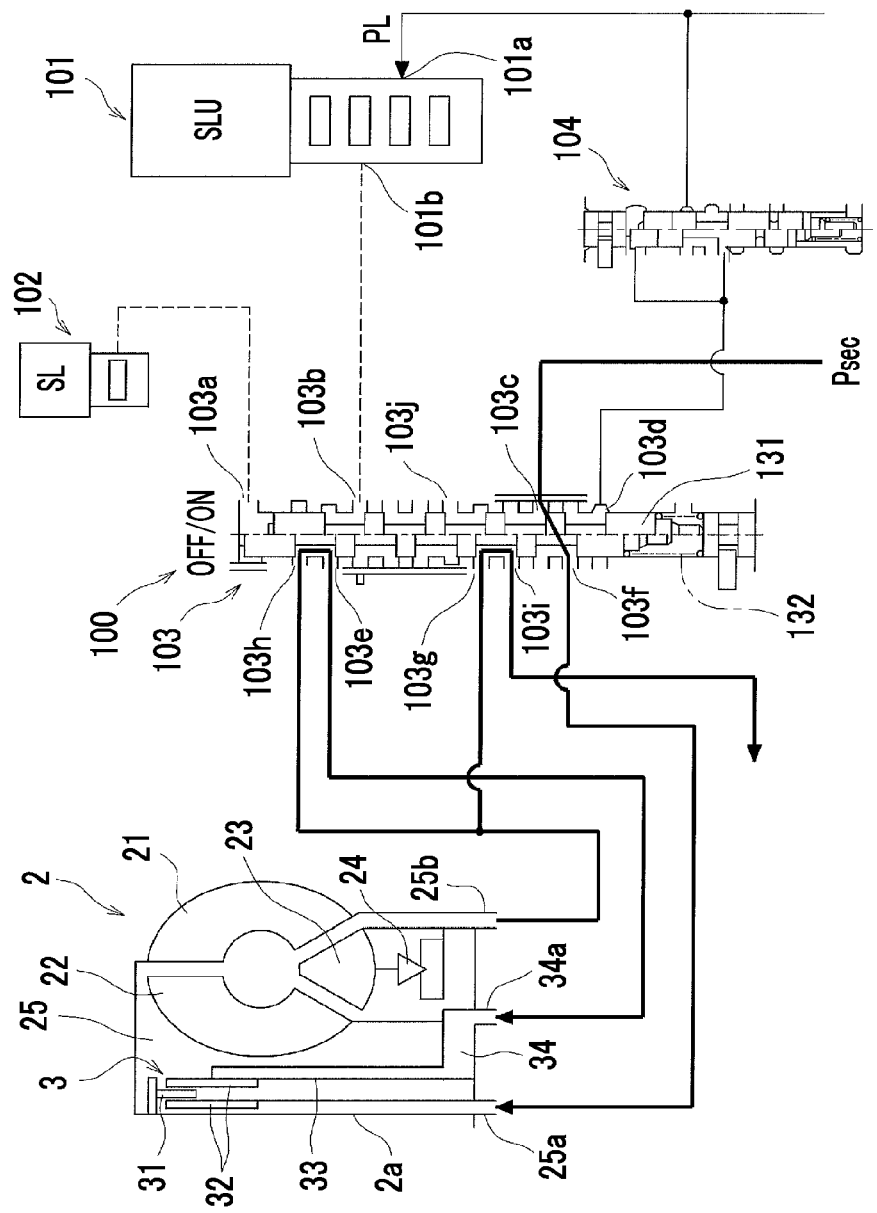
FIG. 4 is a view showing an operation at the time of a lockup OFF state in the oil pressure control circuit of FIG. 3.

Then, when no signal pressure from the solenoid valve (SL) 102 is input to the signal pressure input port 103*a* (at the time of a lockup OFF state), the lockup relay valve 103 has a spool 131 arranged at an upper position in FIG. 3 (the spool 131 is located at a position shown on the left side in FIG. 3) due to an urging force of a spring 132. Thus, as shown in FIG. 4, the secondary pressure Psec is supplied to the T/C input port 25*a* (a converter oil chamber 25) of the torque converter 2 via the lockup relay valve 103. Besides, the hydraulic oil that has circulated through the converter oil chamber 25 of the torque converter 2 is output from the T/C output port 25*b*, and flows into the two exhaust pressure input ports 103*g* and 103*h* of the lockup relay valve 103 respectively. The hydraulic oil that has flowed into the exhaust pressure input port 103*g* on the lower side in the drawing is supplied from the cooling port 103*i* to the cooler.

Besides, the hydraulic oil that has flowed into the exhaust pressure input port 103*h* on the upper side in the drawing is input to the L/U input port 34*a* of the multiple plate lockup clutch 3 from the L/U pressure output port 103*e*.

Figure 5:
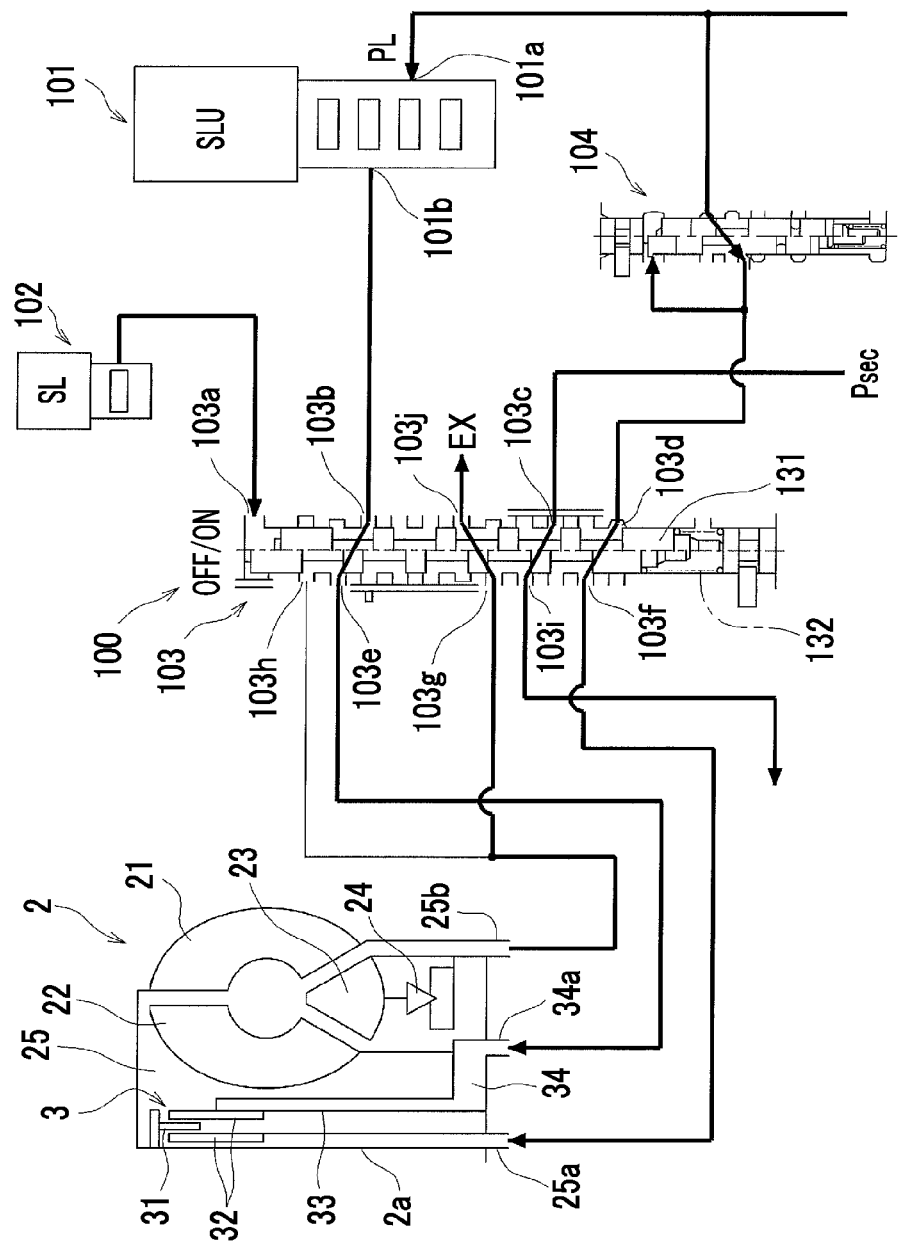
FIG. 5 is a view showing an operation at the time of a lockup ON state in the oil pressure control circuit of FIG. 3.

On the other hand, when both the linear solenoid valve (SLU) 101 and the solenoid valve (SL) 102 turn ON in accordance with a command from the ECU 200 and a signal pressure from the solenoid valve (SL) 102 is input to the signal pressure input port 103*a* of the lockup relay valve 103 (when a lockup ON state is established), the spool 131 moves downward against the urging force of the spring 132, and is arranged at a lower position in FIG. 3 (the spool 131 is located at a position shown on the right side in FIG. 3). Thus, as shown in FIG. 5, the Cir-MOD pressure from the Cir-MOD valve 104 is supplied to the T/C input port 25*a* (the converter oil chamber 25) of the torque converter 2 via the lockup relay valve 103. Besides, the hydraulic oil that has circulated through the converter oil chamber 25 of the torque converter 2 is output from the T/C output port 25*b*, flows into the exhaust pressure input port 103*g* of the lockup relay valve 103 on the lower side in the drawing, and is discharged from the exhaust port 103*j*. Furthermore, a control oil pressure that is output by the linear solenoid valve (SLU) 101 is supplied to the L/U pressure input port 103*b* (the lockup oil chamber 34) of the multiple plate lockup clutch 3 via the lockup relay valve 103.

ECU—The ECU 200 is equipped with a central processing unit (a CPU), a read only memory (a ROM), a random access memory (a RAM), a backup RAM and the like.

Various control programs, maps that are referred to in executing the various control programs, and the like are stored in the ROM. The CPU carries out a computation process based on the various control programs and maps stored in the ROM. Besides, the RAM is a memory that temporarily stores a computation result of the CPU, data input from respective sensors and the like. The backup RAM is a non-volatile memory that stores data and the like to be saved at the time of stoppage of the engine 1 or the like.

Figure 6:
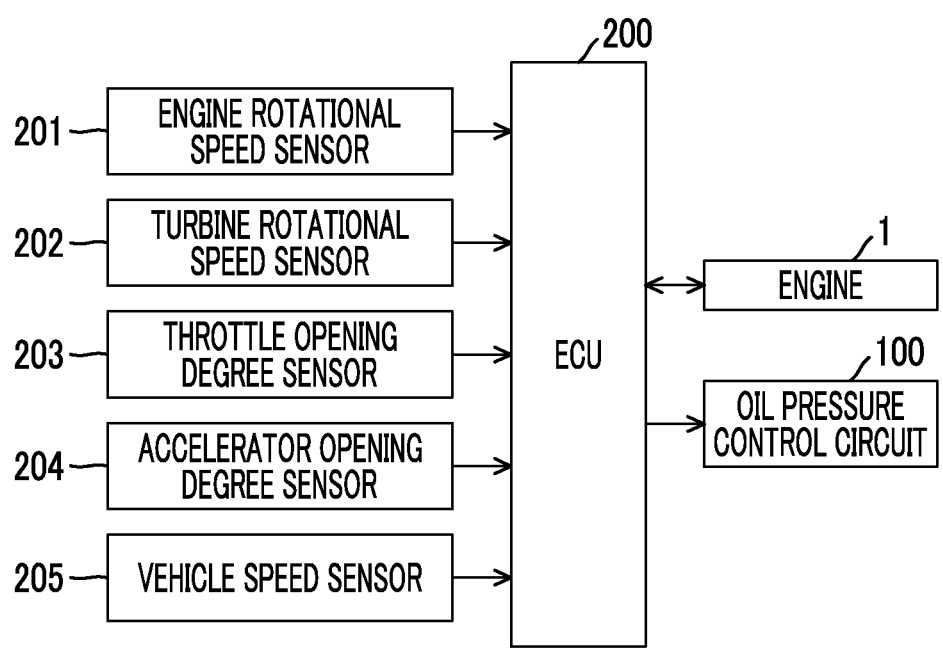

As shown in FIG. 6, the various sensors such as the engine rotational speed sensor 201, the turbine rotational speed sensor 202, a throttle opening degree sensor 203 that detects a throttle opening degree of a throttle valve (not shown), an accelerator opening degree sensor 204 that detects an accelerator opening degree as a depression amount of an accelerator pedal (not shown), a vehicle speed sensor 205 that outputs a signal corresponding to a vehicle speed of the vehicle 300, and the like are connected to the ECU 200. Signals from these respective sensors (including a group of switches) are input to the ECU 200.

Then, the ECU 200 is configured to be able to control the operating state of the engine 1 by controlling the throttle opening degree, a fuel injection amount, an ignition timing and the like based on detection results of the various sensors and the like.

The ECU 200 performs shift control of the automatic transmission 4, oil pressure control of the torque converter 2, and engagement control of the multiple plate lockup clutch 3 (hereinafter referred to also as lockup clutch control) by controlling the oil pressure control circuit 100. Besides, the ECU 200 performs "transition control from a driven state to a driving state and transition control from the driving state to the driven state" (hereinafter referred to also as driving/driven transition control) that will be described later.

Lockup Clutch Control—Next, lockup clutch control that is performed by the ECU 200 will be described.

In lockup clutch control, a lockup clutch oil pressure (a command oil pressure) is controlled using a target clutch torque capacity.

In this lockup clutch control, the target clutch torque capacity (hereinafter referred to also as a driving target clutch torque capacity) that is needed when the transmission is in the driving state (a state where the transmission drives the driving wheels of the vehicle) is obtained with reference to, for example, a map set in advance through an experiment or a simulation based on an accelerator opening degree Pap that is obtained from an output signal of the accelerator opening degree sensor 204, an engine torque Te, and the like.

Besides, the target clutch torque capacity (hereinafter referred to also as a driven target clutch torque capacity) that is needed when the transmission is in the driven state (a state where the transmission is driven from the driving wheels of the vehicle) is calculated with reference to, for example, a map set in advance through an experiment or a simulation based on the engine torque Te and the like.

Incidentally, the engine torque Te is obtained with reference to, for example, a map set in advance through an experiment or a simulation based on the accelerator opening degree Pap that is obtained from an output signal of the accelerator opening degree sensor 204, the engine rotational speed Ne that is obtained from an output signal of the engine rotational speed sensor 201, and the like. Besides, the engine torque Te may be directly detected by providing the crankshaft 11 of the engine 1 with a torque sensor.

Besides, a running state of the vehicle etc., such as the vehicle speed or the like may be added to parameters for calculating the aforementioned driving target clutch torque capacity and the aforementioned driven target clutch torque capacity.

Driving/Driven Transition Control—Next, driving/driven transition control that is performed by the ECU 200 will be described.

First of all, in lockup clutch control, at the time of a driving/driven changeover, a shock or the racing of the rotational speed of the engine 1 may occur unless the clutch torque capacity of the multiple plate lockup clutch 3 is appropriately controlled in consideration of a change in the engine torque resulting from the changeover, or the like.

That is, at the time of a driving/driven changeover, there is a difference between the pre-changeover target clutch torque capacity and the post-changeover target clutch torque capacity (the target clutch torque capacity that is needed in the driven state and the target clutch torque capacity that is needed in the driving state are different from each other). Therefore, when the target clutch torque capacity is immediately changed over at the time of a driving/driven changeover, a shock or the racing of the rotational speed of the engine 1 may occur due to an abrupt change in the target clutch torque capacity.

Incidentally, a shock and the like can be restrained from occurring by holding the multiple plate lockup clutch 3 in a released state (a torque converter state) for a certain time at the time of a driving/driven changeover. In this case, however, it takes time until the multiple plate lockup clutch 3 is engaged, so there are problems such as a decrease in drivability, a deterioration in fuel economy effect, and the like.

With a view to solving such problems, the present embodiment of the present disclosure makes it possible to appropriately control the target clutch torque capacity of the multiple plate lockup clutch 3 at the time of a transition from the driven state to the driving state and at the time of a transition from the driving state to the driven state. An example of concrete control (driving/driven transition control) will be described with reference to flowcharts of FIGS. 7 and 8. Control routines of FIGS. 7 and 8 are repeatedly executed at intervals of a predetermined time (e.g., 4 milliseconds) in the ECU 200.

Figure 7:
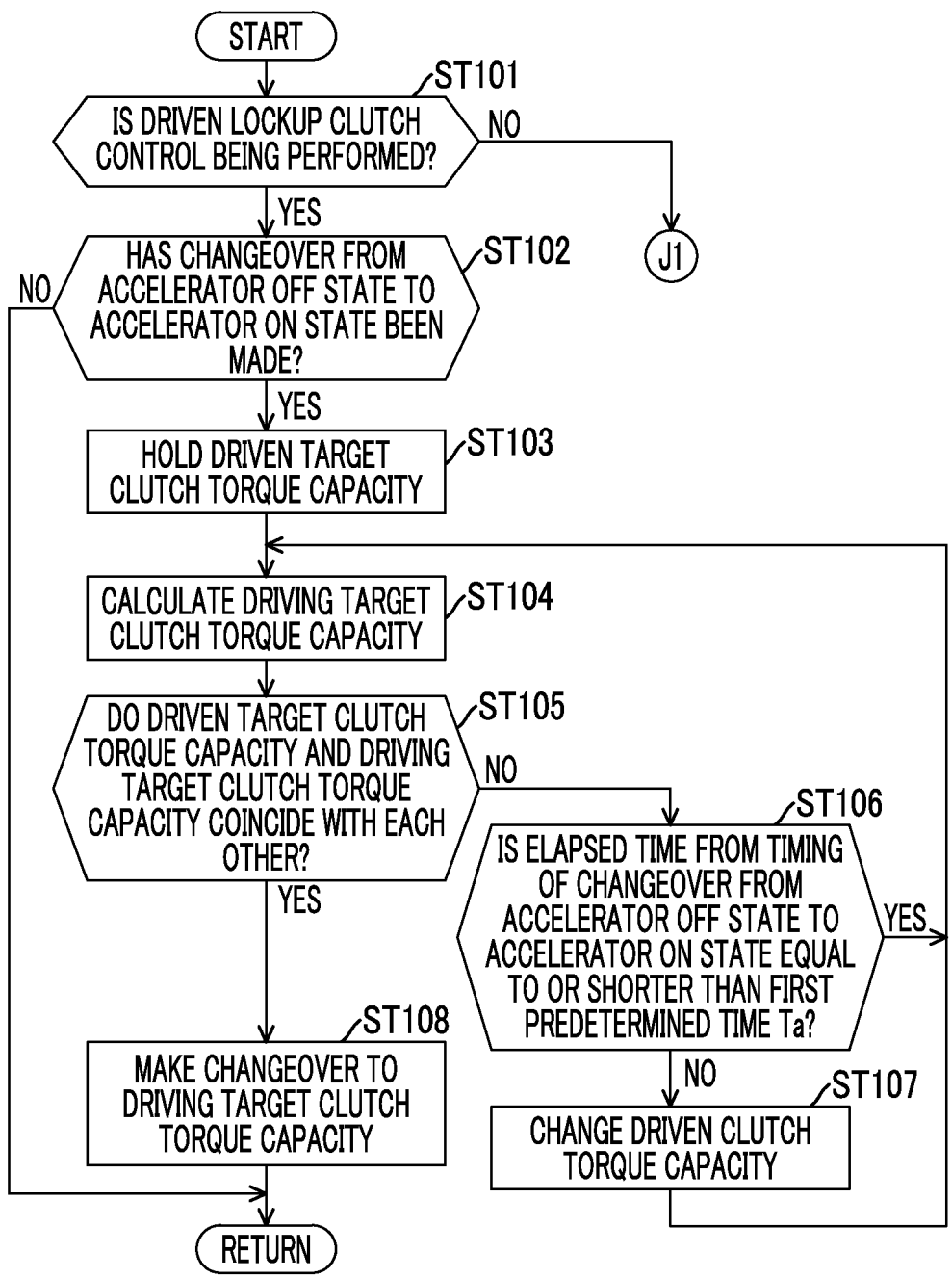
FIG. 7 is a flowchart showing an example of driving/driven transition control that is performed by the ECU.
Figure 8:
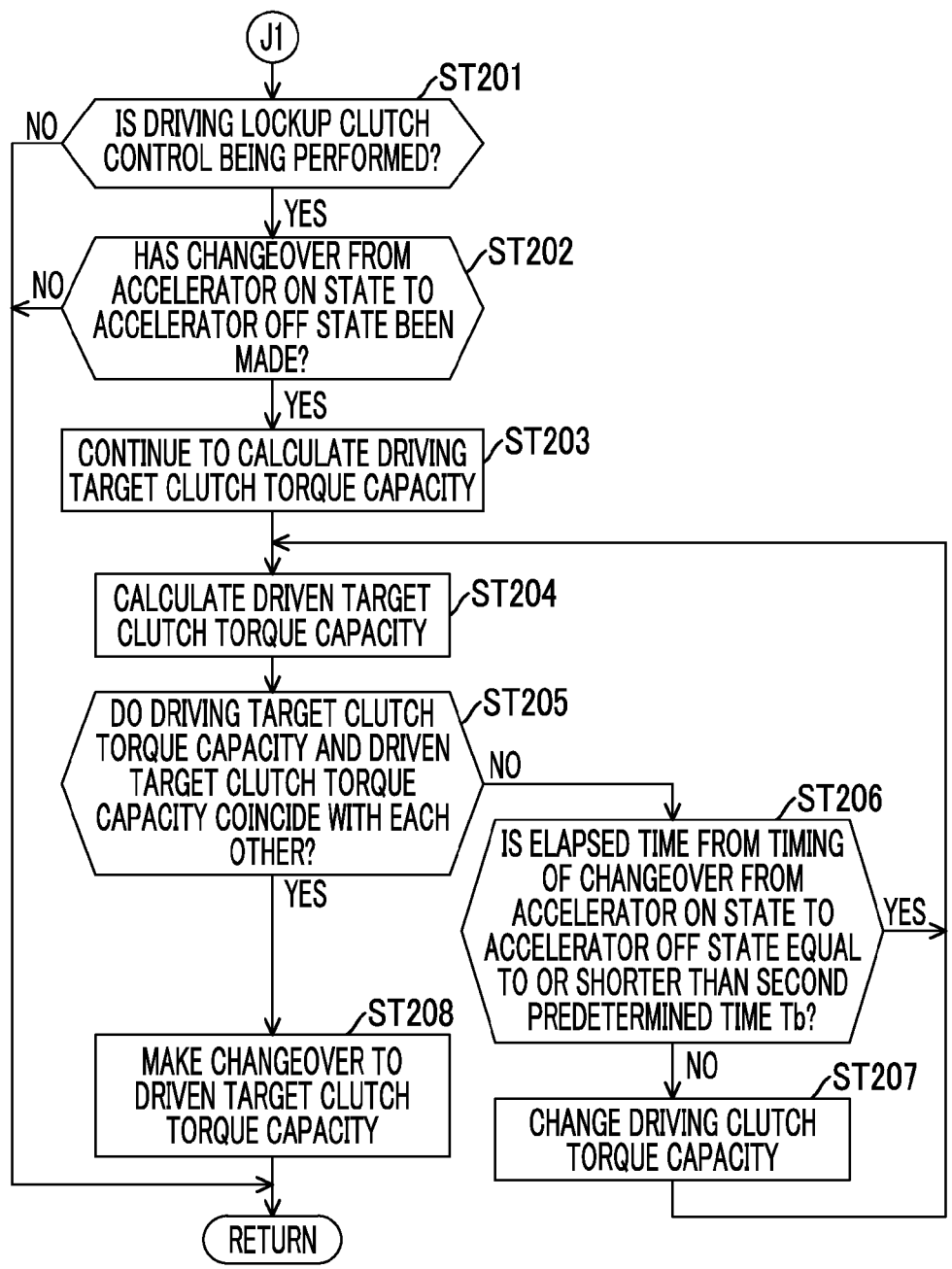
FIG. 8 is a flowchart showing another example of driving/driven transition control that is performed by the ECU.

<Transition Control from Driven State to Driving State>
First of all in step ST101 of FIG. 7, it is determined whether or not lockup clutch control in the driven state is being performed. If the result of the determination in step ST101 is negative (NO), a shift to step ST201 of FIG. 8 is made. The processing of step ST201 will be described later. If the result of the determination in step ST101 is affirmative (YES) (if lockup clutch control in the driven state is being performed), a shift to step ST102 is made.

Incidentally, as for "the determination in the driven state", it is determined that the transmission is in the driven state when the accelerator is in an accelerator OFF state (this determination is made from an output signal of the accelerator opening degree sensor 204). Besides, during the performance of driven lockup clutch control, the driven target clutch torque capacity is calculated with reference to, for example, a map set in advance through an experiment or a simulation based on the engine torque Te and the like.

In step ST102, it is determined, based on an output signal of the accelerator opening degree sensor 204, whether or not a changeover from the accelerator OFF state to an accelerator ON state has been made. If the result of the determination in step ST102 is negative (NO), a return is made. If the result of the determination in step ST102 is affirmative (YES) (if a changeover from the accelerator OFF state to the accelerator ON state has been made), a shift to step ST103 is made.

In step ST103, the driven target clutch torque capacity at the time when a changeover from the accelerator OFF state to the accelerator ON state is made is held (the driven target clutch torque capacity is held equal to a value at a timing when a changeover from the accelerator OFF state to the accelerator ON state is made (e.g., at a timing t11 of FIG. 9)). Incidentally, the driven target clutch torque capacity is held for the following reason. When the driven target clutch torque capacity changes due to a change in the accelerator opening degree or the like after a changeover to the accelerator ON state, the later-described control of making a changeover from the driven target clutch torque capacity to the driving target clutch torque capacity becomes unstable, so this must be avoided.

In step ST104, the driving target clutch torque capacity necessary for driving lockup clutch control is calculated. In concrete terms, the driving target clutch torque capacity is calculated with reference to, for example, a map set in advance through an experiment or a simulation based on the accelerator opening degree Pap, the engine torque Te and the like. The driving target clutch torque capacity is sequentially calculated from a timing when a changeover from the accelerator OFF state to the accelerator ON state is made. The driving target clutch torque capacity that is calculated from this timing of the changeover is a value that is smaller than the driven target clutch torque capacity at the beginning of the changeover, and gradually increases from the timing of the changeover as the accelerator opening degree Pap (the engine torque Te) increases (see FIGS. 9 and 10).

It should be noted herein that a change in the driving target clutch torque capacity may be estimated through look-ahead calculation or the like, based on, for example, an amount of change in the accelerator opening degree Pap per unit time (an accelerator opening degree change rate) after a changeover from the accelerator OFF state to the accelerator ON state.

Incidentally, when a changeover from the accelerator OFF state to the accelerator ON state is made, the driving target clutch torque capacity may become larger than the driven target clutch torque capacity on a certain condition. In this case, however, a changeover from the driven target clutch torque capacity to the driving target clutch torque capacity is made as soon as a changeover to the accelerator ON state is made.

Subsequently in step ST105, the driven target clutch torque capacity held in step ST103 and the driving target clutch torque capacity obtained through the calculation processing in step ST104 are compared with each other (a comparison between the driven target clutch torque capacity and the driving target clutch torque capacity is started upon a changeover from the accelerator OFF state to the accelerator ON state), and it is determined whether or not the driven target clutch torque capacity and the driving target clutch torque capacity coincide with each other. If the result of the determination in step ST105 is negative (NO), a shift to step ST106 is made.

In step ST106, it is determined whether or not an elapsed time from a determination that a changeover from the accelerator OFF state to the accelerator ON state has been made (an elapsed time from the determination processing in step ST102) is equal to or shorter than a first predetermined time Ta. If the result of the determination in step ST106 is affirmative (YES), a return to step ST104 is made, and the processing procedure from this step ST104 to step ST106 is repeatedly carried out.

Then, if the driven target clutch torque capacity (a constant value) and the driving target clutch torque capacity that changes in an increasing manner coincide with each other (if the result of the determination in step ST105 becomes YES) while the result of the determination in step ST106 is affirmative (YES) (while the elapsed time is equal to or shorter than the first predetermined time Ta), a shift to step ST108 is made.

In step ST108, the target clutch torque capacity for use in lockup clutch control is changed over from the driven target clutch torque capacity to the driving target clutch torque capacity.

On the other hand, if the driven target clutch torque capacity and the driving target clutch torque capacity do not coincide with each other (if the result of the determination in step ST105 is NO) when the elapsed time from the aforementioned determination that a changeover from the accelerator OFF state to the accelerator ON state has been made is not equal to or shorter than the first predetermined time Ta, a shift to step ST107 is made.

In step ST107, the driven target clutch torque capacity is changed. In concrete terms, sweep-down for forcibly reducing the driven target clutch torque capacity is carried out (the driven target clutch torque capacity is changed toward the driving target clutch torque capacity). After that, a return to step ST104 is made, and the processing procedure from this step ST104 to step S107 is repeatedly carried out.

Then, if the driven target clutch torque capacity during sweep-down and the driving target clutch torque capacity that changes in an increasing manner coincide with each other (if the result of the determination in step ST105 becomes YES), the target clutch torque capacity for use in lockup clutch control is changed over from the driven target clutch torque capacity to the driving target clutch torque capacity (step ST108).

It should be noted herein that the first predetermined time Ta for use in the determination in step ST106 is set in advance through an experiment or a simulation from the standpoint of restraining the time necessary for the control of making a changeover from the driven target clutch torque capacity to the driving target clutch torque capacity from becoming long and enabling a swift transition to the driving target clutch torque capacity.

<Transition Control from Driving State to Driven State>

Subsequently, if the result of the determination in the aforementioned step ST101 is negative (NO) (if driven lockup clutch control is not being performed), a shift to step ST201 of FIG. 8 is made to determine whether or not driving lockup clutch control is being performed. If the result of the determination in ST201 is negative (NO), a return is made. If the result of the determination in step ST201 is affirmative (YES) (if driving lockup clutch control is being performed), a shift to step ST202 is made.

Incidentally, as for "the determination in the driving state", it is determined that the transmission is in the driving state when the accelerator is in the accelerator ON state (which is determined from an output signal of the accelerator opening degree sensor 204). Besides, during the performance of driving lockup clutch control, the driving target clutch torque capacity is calculated with reference to, for example, a map set in advance through an experiment or a simulation based on the accelerator opening degree Pap, the engine torque Te and the like.

In step ST202, it is determined, based on an output signal of the accelerator opening degree sensor 204, whether or not a changeover from the accelerator ON state to the accelerator OFF state has been made. If the result of the determination in step ST202 is negative (NO), a return is made. If the result of the determination in step ST202 is affirmative (YES) (if a changeover from the accelerator ON state to the accelerator OFF state has been made), a shift to step ST203 is made.

In step ST203, the driving target clutch torque capacity continues to be calculated even after a changeover from the accelerator ON state to the accelerator OFF state. It should be noted herein that since the accelerator is in the accelerator OFF state, the driving target clutch torque capacity after a changeover to the accelerator OFF state decreases as the engine torque Te decreases (see FIGS. 11 and 12). It should be noted, however, that when the residual engine torque in turning off the accelerator (the residual engine torque resulting from the volume of an intake pipe or the like) is large, the driving target clutch torque capacity may decrease with a delay (see FIG. 12).

In step ST204, the driven target clutch torque capacity necessary for driven lockup clutch control is calculated. In concrete terms, for example, the driven target clutch torque capacity is calculated with reference to, for example, a map set in advance through an experiment or a simulation based on the engine torque Te or the like upon or after a changeover from the accelerator ON state to the accelerator OFF state. This driven target clutch torque capacity is a value that is smaller than the driving target clutch torque capacity at the beginning of a changeover from the accelerator ON state to the accelerator OFF state. Besides, the driven target clutch torque capacity is a constant value because the accelerator is in the accelerator OFF state.

Incidentally, at the time of a changeover from the accelerator ON state to the accelerator OFF state, the driven target clutch torque capacity may become larger than the driving target clutch torque capacity on a certain condition. In this case, however, a changeover from the driving target clutch torque capacity to the driven target clutch torque capacity is made as soon as a changeover to the accelerator OFF state is made.

Subsequently in step ST205, the driving target clutch torque capacity and the driven target clutch torque capacity are compared with each other (a comparison between the driving target clutch torque capacity and the driven target clutch torque capacity is started upon a changeover from the accelerator ON state to the accelerator OFF state), and it is determined whether or not the driving target clutch torque capacity and the driven target clutch torque capacity coincide with each other. If the result of the determination in step ST205 is negative (NO), a shift to step ST206 is made.

In step ST206, it is determined whether or not an elapsed time from a determination that a changeover from the accelerator ON state to the accelerator OFF state has been made (an elapsed time from the determination in step ST202) is equal to or shorter than a second predetermined time Tb. If the result of the determination in step ST206 is affirmative (YES), a return to step ST204 is made, and the processing procedure from this step ST204 to step ST206 is repeatedly carried out.

Then, if the driving target clutch torque capacity that changes in a decreasing manner and the driven target clutch torque capacity (the constant value) coincide with each other while the result of the determination in step ST206 is affirmative (YES) (while the elapsed time is equal to or shorter than the second predetermined time Tb) (if the result of the determination in step ST205 becomes YES), a shift to step ST208 is made.

In step ST208, the target clutch torque capacity for use in lockup clutch control is changed over from the driving target clutch torque capacity to the driven target clutch torque capacity.

On the other hand, if the driving target clutch torque capacity and the driven target clutch torque capacity do not coincide with each other when the elapsed time from the determination that a changeover from the accelerator ON state to the accelerator OFF state has been made is not equal to or shorter than the second predetermined time Tb (if the result of the determination in step ST206 is NO), a shift to step ST207 is made.

In step ST207, the driving target clutch torque capacity is changed. In concrete terms, sweep-down for forcibly reducing the driving target clutch torque capacity is carried out (the driving target clutch torque capacity is changed toward the driven target clutch torque capacity). After that, a return to step ST204 is made, and the processing procedure from this step ST204 to step ST207 is repeatedly carried out.

Then, if the driving target clutch torque capacity and the driven target clutch torque capacity (the constant value) coincide with each other during sweep-down (if the result of the determination in step ST205 becomes YES), the target clutch torque capacity for use in lockup clutch control is changed over from the driving target clutch torque capacity to the driven target clutch torque capacity (step ST208).

It should be noted herein that the second predetermined time Tb for use in the determination in step ST206 is set in advance through an experiment or a simulation from the standpoint of restraining the time necessary for the control of making a changeover from the driving target clutch torque capacity to the driven target clutch torque capacity from becoming long and enabling a swift transition to the driven target clutch torque capacity.

Incidentally, when steps ST101 to ST108 of FIG. 7 and steps ST201 to ST208 of FIG. 8 are carried out by the ECU 200, "the lockup clutch control means" of the present disclosure is thereby realized. Besides, when step ST102 of FIG. 7 and step ST202 of FIG. 8 are carried out by the ECU 200, "the accelerator operation determination means" of the present disclosure is thereby realized.

Transition Control from Driven State to Driving State (Advanced Depression of Accelerator Pedal)—Next, an example of transition control from the driven state to the driving state (an example of advanced depression of the accelerator pedal) will be described with reference to a timing chart of FIG. 9.

First of all, in the driven (accelerator OFF) state, the target clutch torque capacity for use in lockup clutch control is the driven target clutch torque capacity, and the engine torque Te is a negative torque.

Subsequently, when a changeover from the accelerator OFF state to the accelerator ON state is made as a result of depression of the accelerator pedal, the driven target clutch torque capacity is held at this timing t11, and a comparison between the held value and the driving target clutch torque capacity (a calculated value) is started. It should be noted herein that the driving target clutch torque capacity is smaller than the driven target clutch torque capacity (the held value) at the beginning of a changeover from the accelerator OFF state to the accelerator ON state but increases due to a change in the accelerator opening degree (the engine torque Te) or the like. Therefore, the driving target clutch torque capacity approaches the driven target clutch torque capacity.

Then, at a timing t11a when the driven target clutch torque capacity and the driving target clutch torque capacity coincide with each other (at a timing when the difference therebetween becomes equal to 0), the target clutch torque capacity for use in lockup clutch control is changed over from the driven target clutch torque capacity to the driving target clutch torque capacity (step ST105 and step ST108 of the control routine in FIG. 7).

As described hitherto, the target clutch torque capacity of the multiple plate lockup clutch 3 can be appropriately controlled at the time of a transition from the driven state to the driving state, by changing over the target clutch torque capacity from the driven target clutch torque capacity to the driving target clutch torque capacity at a timing when the difference between the driven target clutch torque capacity and the driving target clutch torque capacity becomes equal to 0 after a changeover from the accelerator OFF state to the accelerator ON state. Thus, a shock can be restrained from occurring at the time of a transition from the driven state to the driving state. In addition, the multiple plate lockup clutch 3 is not rendered in the released state (the torque converter state) at the time of a transition from the driven state to the driving state. Therefore, the target clutch torque capacity can be changed over (from the target clutch torque capacity for the driven state to the target clutch torque capacity for the driving state) while continuing lockup clutch control (engagement control of the multiple plate lockup clutch 3).

Figure 9:
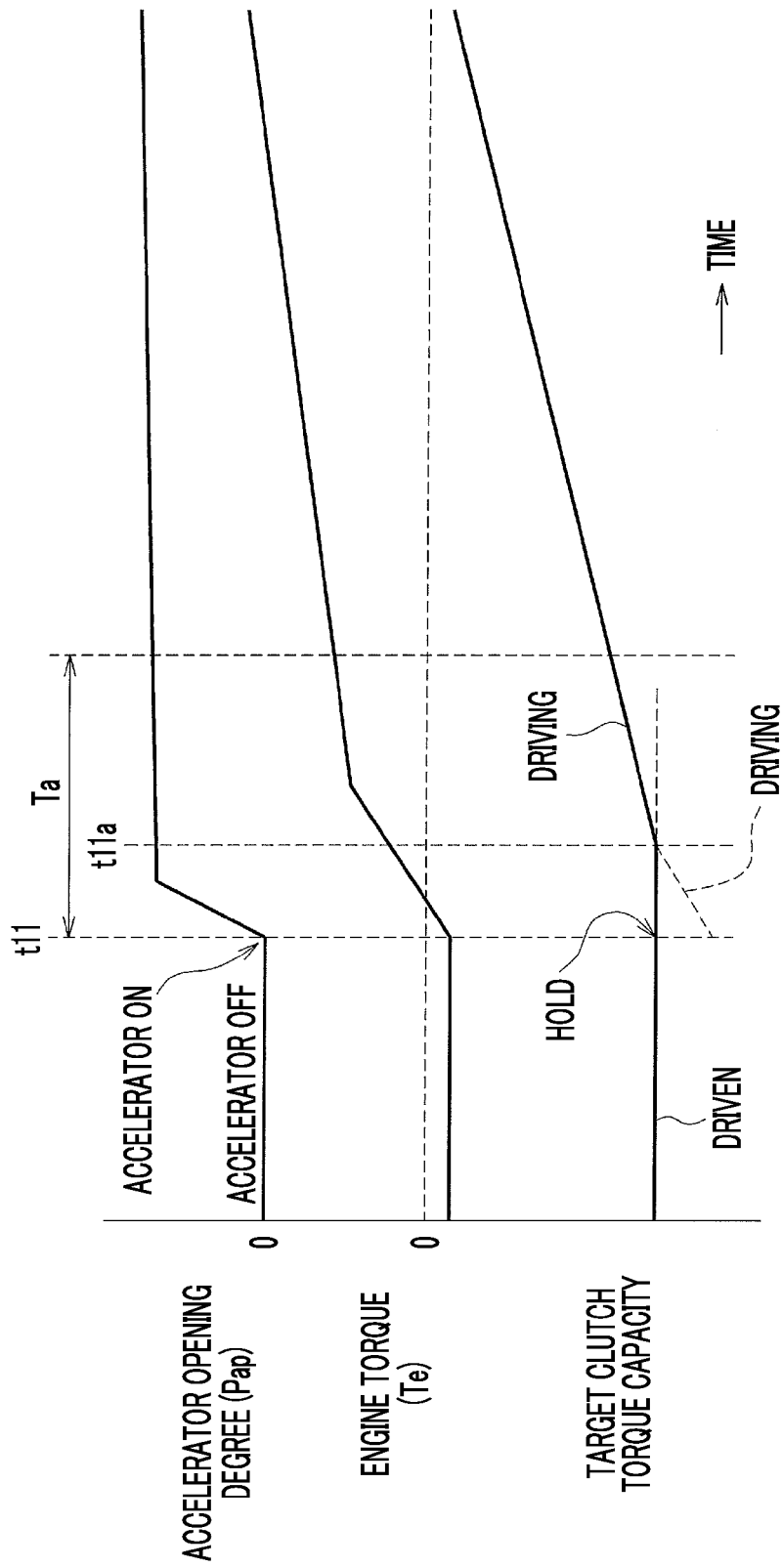
FIG. 9 is a timing chart showing an example of transition control from a driven state to a driving state.

Incidentally, the example of FIG. 9 indicates that the control of making a changeover to the driving target clutch torque capacity can be ended within the first predetermined time Ta from the timing t11 when a changeover from the accelerator OFF state to the accelerator ON state is made.

Transition Control from Driven State to Driving State (Delayed Depression of Accelerator Pedal)—Next, another example of transition control from the driven state to the driving state (an example of delayed depression of the accelerator pedal) will be described with reference to a timing chart of FIG. 10.

Figure 10:
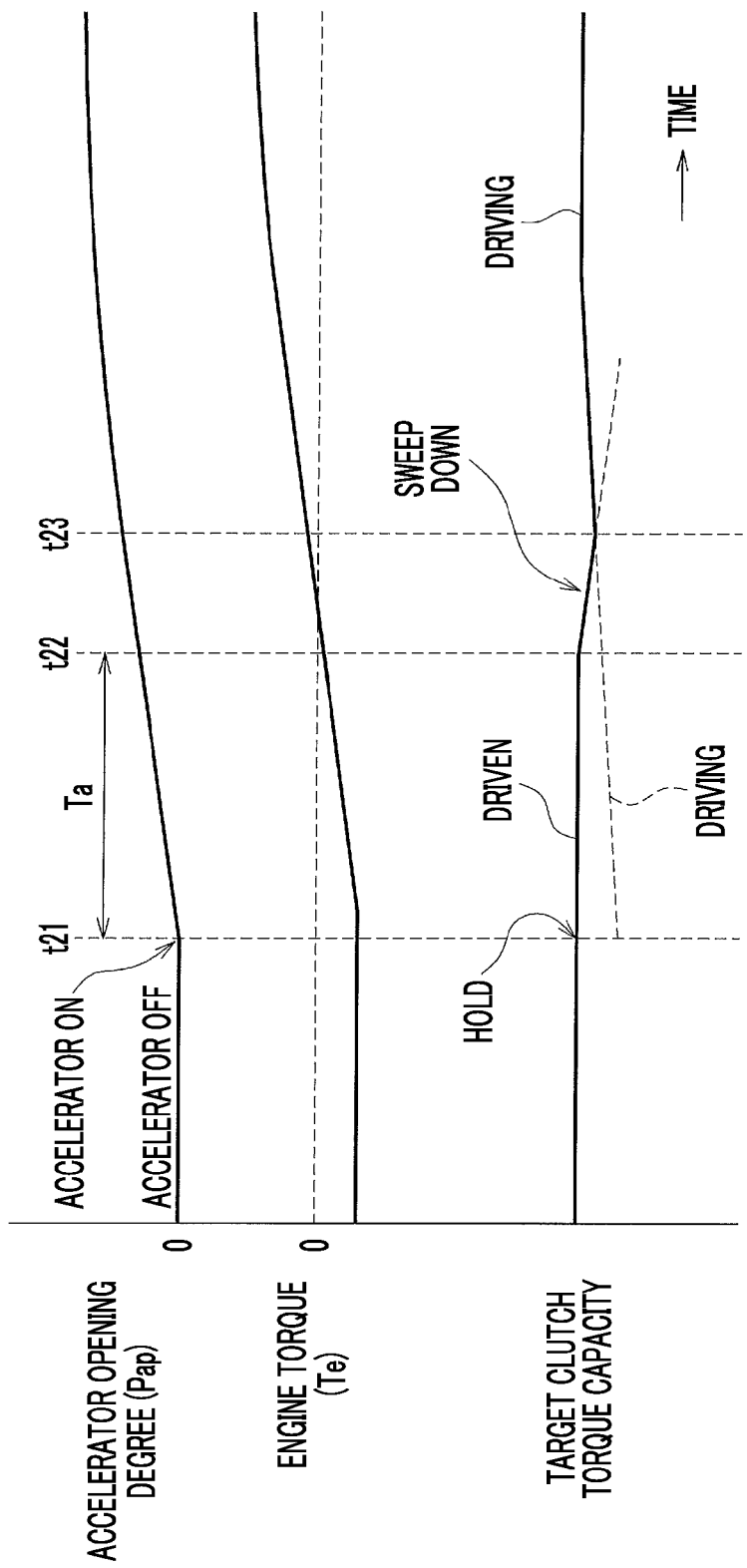
FIG. 10 is a timing chart showing another example of transition control from the driven state to the driving state.

In this example of FIG. 10 as well, when a changeover from the accelerator OFF state to the accelerator ON state is made as a result of depression of the accelerator pedal, the driven target clutch torque capacity is held at this timing, namely, a timing t21, and a comparison between the held value and the driving target clutch torque capacity (the calculated value) is started.

It should be noted herein that the accelerator pedal is depressed later and hence the rate of increase in the driving target clutch torque capacity is smaller in this example of FIG. 10 than in the aforementioned example of FIG. 9. Therefore, the driving target clutch torque capacity may not reach the driven target clutch torque capacity while the elapsed time from the timing t21 when a changeover from the accelerator OFF state to the accelerator ON state is made is equal to or shorter than the first predetermined time Ta. In this case, from a timing t22 when the first predetermined time Ta elapses from the timing t21 when a changeover from the accelerator OFF state to the accelerator ON state is made (a timing when the result of the determination in step ST106 of the control routine in FIG. 7 becomes negative (NO)), sweep-down for uniformly reducing the driven target clutch torque capacity is carried out (step ST107 of the control routine in FIG. 7).

Then, at a timing t23 when the driven target clutch torque capacity and the driving target clutch torque capacity coincide with each other during this sweep-down (a timing when the difference therebetween becomes equal to 0), the target clutch torque capacity for use in lockup clutch control is changed over from the driven target clutch torque capacity to the driving target clutch torque capacity (step ST105 and step ST108 of the control routine in FIG. 7).

In this example as well, at the timing when the difference between the driven target clutch torque capacity and the driving target clutch torque capacity becomes equal to 0 after a changeover from the accelerator OFF state to the accelerator ON state, the target clutch torque capacity is changed over from the driven target clutch torque capacity to the driving target clutch torque capacity. Therefore, the target clutch torque capacity of the multiple plate lockup clutch 3 can be appropriately controlled at the time of a transition from the driven state to the driving state. Thus, a shock can be restrained from occurring at the time of a transition from the driven state to the driving state. Besides, the target clutch torque capacity can be changed over (from the target clutch torque capacity for the driven state to the target clutch torque capacity for the driving state) while continuing lockup clutch control (engagement control of the multiple plate lockup clutch 3).

In addition, in this example, when the first predetermined time Ta elapses from the timing t21 when a changeover from the accelerator OFF state to the accelerator ON state is made, the driven target clutch torque capacity is forcibly swept down. Therefore, even in the case where the change in the accelerator opening degree is small (in the case of delayed depression of the accelerator pedal), the time necessary for the control of making a changeover from the driven target clutch torque capacity to the driving target clutch torque capacity can be restrained from becoming long. Thus, a swift transition to the driving target clutch torque capacity can be made at the time of a transition from the driven state to the driving state.

Transition Control (1) from Driving State to Driven State—Next, an example of transition control from the driving state to the driven state will be described with reference to a timing chart of FIG. 11.

First of all, in the driving (accelerator ON) state, the target clutch torque capacity for use in lockup clutch control is the driving target clutch torque capacity, and the engine torque Te is a positive torque.

Subsequently, when a changeover from the accelerator ON state to the accelerator OFF state is made, a comparison between the driving target clutch torque capacity and the driven target clutch torque capacity is started at this timing, namely, a timing t31. It should be noted herein that since the accelerator is in the accelerator OFF state, the driving target clutch torque capacity after a changeover from the accelerator ON state to the accelerator OFF state decreases as the engine torque Te decreases. Besides, the driven target clutch torque capacity is a value (a constant value) that is smaller than the driving target clutch torque capacity at the beginning of a changeover from the accelerator ON state to the accelerator OFF state. Accordingly, while decreasing, the driving target clutch torque capacity approaches the driven target clutch torque capacity.

Then, at a timing t31a when the driving target clutch torque capacity and the driven target clutch torque capacity coincide with each other (at a timing when the difference therebetween becomes equal to 0), the target clutch torque capacity for use in lockup clutch control is changed over from the driving target clutch torque capacity to the driven target clutch torque capacity (step ST205 and step ST208 of the control routine in FIG. 8).

As described hitherto, the target clutch torque capacity of the multiple plate lockup clutch 3 can be appropriately controlled at the time of a transition from the driving state to the driven state, by changing over the target clutch torque capacity from the driving target clutch torque capacity to the driven target clutch torque capacity at the timing when the difference between the driving target clutch torque capacity and the driven target clutch torque capacity becomes equal to 0 after a changeover from the accelerator ON state to the accelerator OFF state. Thus, a shock can be restrained from occurring at the time of a transition from the driving state to the driven state. In addition, the multiple plate lockup clutch 3 is not rendered in the released state (the torque converter state) at the time of a transition from the driving state to the driven state. Therefore, the target clutch torque capacity can be changed over (from the target clutch torque capacity for the driving state to the target clutch torque capacity for the driven state) while continuing lockup clutch control (engagement control of the multiple plate lockup clutch 3).

Figure 11:
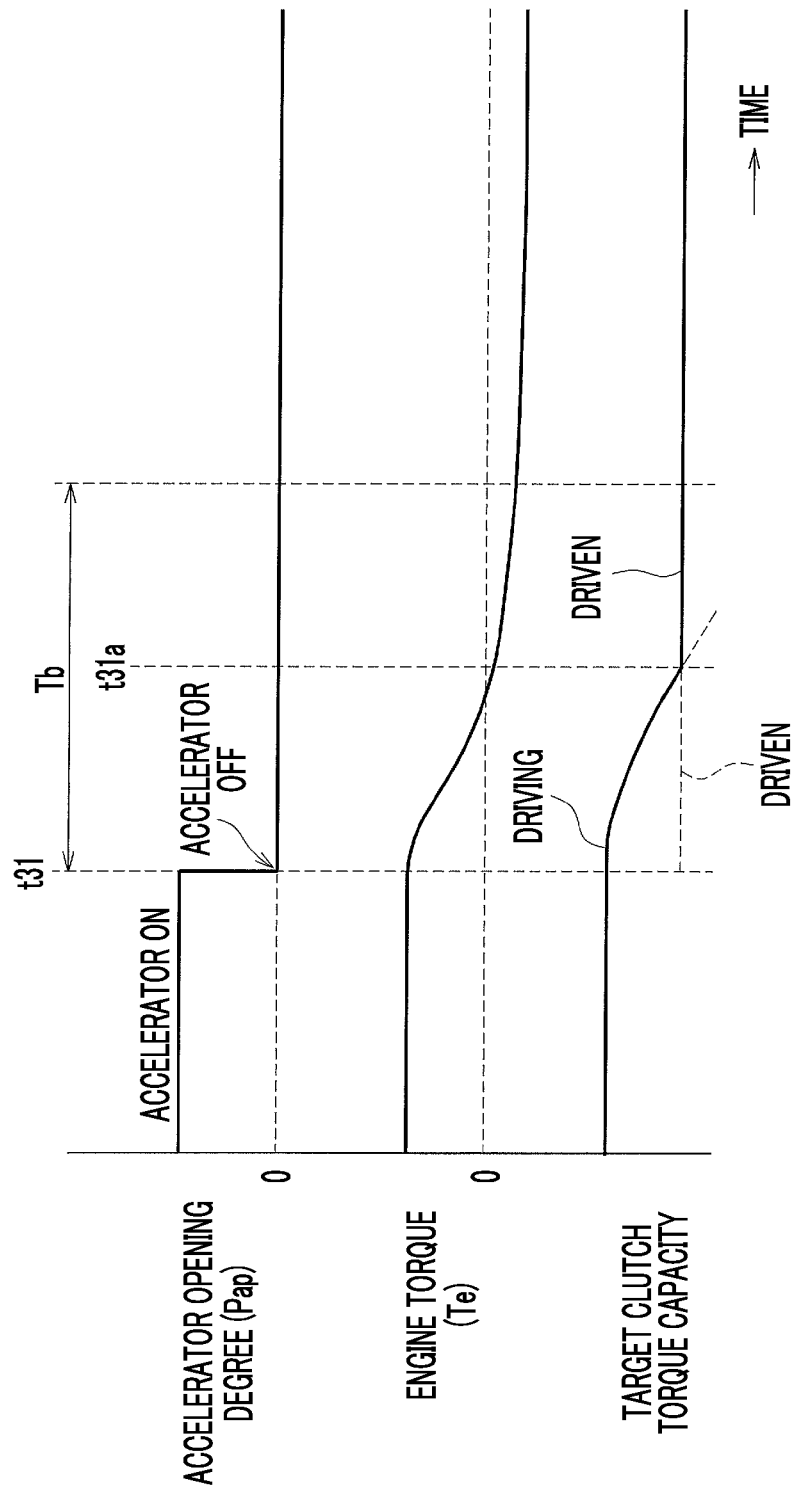
FIG. 11 is a timing chart showing an example of transition control from the driving state to the driven state.

Incidentally, the example of FIG. 11 indicates that the control of making a changeover to the driven target clutch torque capacity can be ended within the second predetermined time Tb from the timing t31 when a changeover from the accelerator ON state to the accelerator OFF state is made.

Transition Control (2) from Driving State to Driven State—Next, another example of transition control from the driving state to the driven state will be described with reference to a timing chart of FIG. 12.

Figure 12:
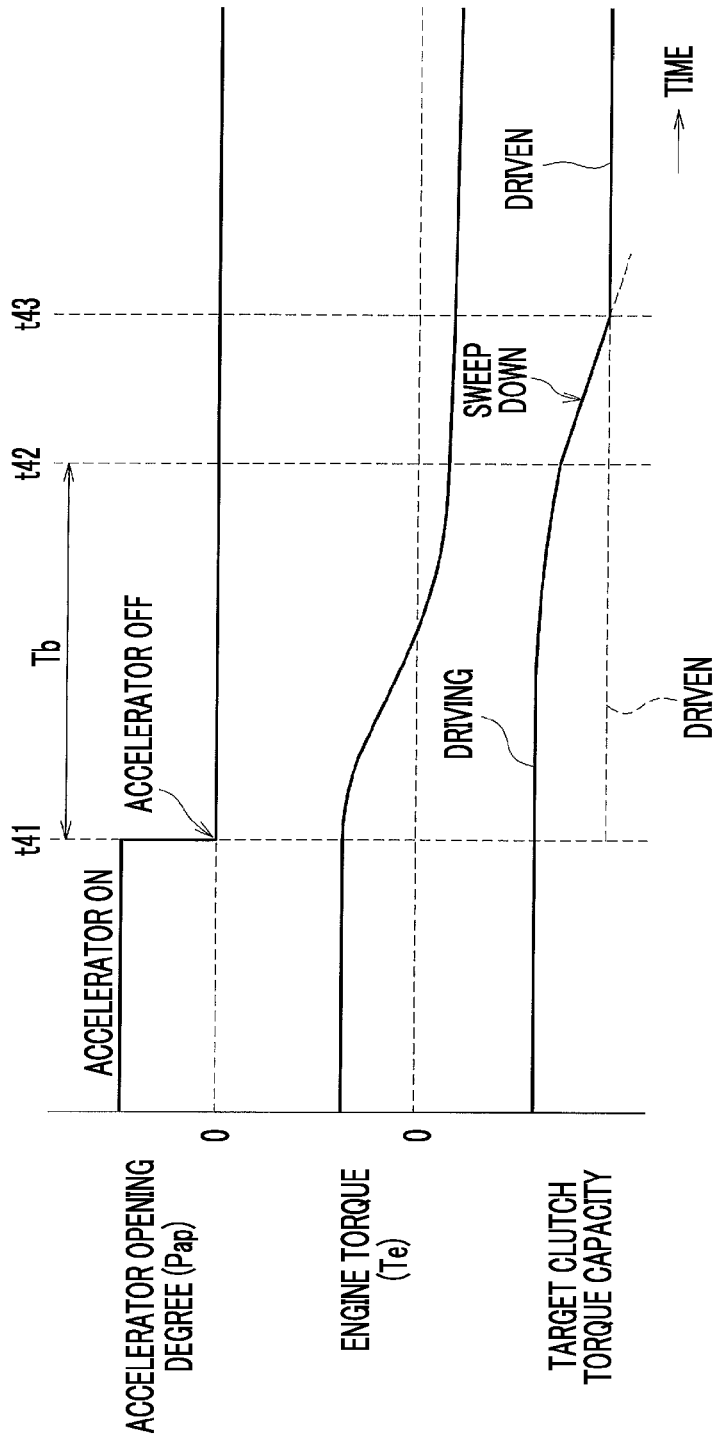
FIG. 12 is a timing chart showing another example of transition control from the driving state to the driven state.

In this example of FIG. 12 as well, when a changeover from the accelerator ON state to the accelerator OFF state is made, a comparison between the driving target clutch torque capacity and the driven target clutch torque capacity is started at this timing, namely, a timing t41.

It should be noted herein that this example of FIG. 12 indicates a case where the residual engine torque is larger than in the aforementioned example of FIG. 11, and that the rate of decrease in the driving target clutch torque capacity that decreases as the engine torque Te decreases is small. Therefore, the driving target clutch torque capacity may not reach the driven target clutch torque capacity while the elapsed time from the timing t41 when a changeover from the accelerator ON state to the accelerator OFF state is made is equal to or shorter than the second predetermined time Tb. In this case, sweep-down for uniformly reducing the driving target clutch torque capacity is carried out from a timing t42 when the second predetermined time Tb elapses from the timing t41 when a changeover from the accelerator ON state to the accelerator OFF state is made (a timing when the result of the determination in step ST206 of the control routine in FIG. 8 becomes negative (NO)) (step ST207 of the control routine in FIG. 8).

Then, at a timing t43 when the driving target clutch torque capacity and the driven target clutch torque capacity coincide with each other during this sweep-down (at a timing when the difference therebetween becomes equal to 0), the target clutch torque capacity for use in lockup clutch control is changed over from the driving target clutch torque capacity to the driven target clutch torque capacity (step ST205 and step ST208 of the control routine in FIG. 8).

In this example as well, at the timing when the difference between the driving target clutch torque capacity and the driven target clutch torque capacity becomes equal to 0 after a changeover from the accelerator ON state to the accelerator OFF state, the target clutch torque capacity is changed over from the driving target clutch torque capacity to the driven target clutch torque capacity. Therefore, the target clutch torque capacity of the multiple plate lockup clutch 3 can be appropriately controlled at the time of a transition from the driving state to the driven state. Thus, a shock can be restrained from occurring at the time of a transition from the driving state to the driven state. Besides, the target clutch torque capacity can be changed over (from the target clutch torque capacity for the driving state to the target clutch torque capacity for the driven state) while continuing lockup clutch control (engagement control of the multiple plate lockup clutch 3).

In addition, in this example, when the second predetermined time Tb elapses from the timing t41 when a changeover from the accelerator ON state to the accelerator OFF state is made, the driving target clutch torque capacity is forcibly swept down. Therefore, even in the case where the residual engine torque is large, the time necessary for the control of making a changeover from the driving target clutch torque capacity to the driven target clutch torque capacity can be restrained from becoming long. Thus, a swift transition to the driven target clutch torque capacity can be made at the time of a transition from the driving state to the driven state.

OTHER EMBODIMENTS

Incidentally, the embodiment of the present disclosure disclosed herein is exemplary in all respects and does not constitute any grounds for limited interpretation. Accordingly, the technical scope of the present disclosure should not be interpreted only by the above-mentioned embodiment of the present disclosure, but is defined based on the description in the claims. Besides, the technical scope of the present disclosure encompasses all the alterations that are equivalent in significance and scope to the claims.

For example, in the foregoing embodiment of the present disclosure, at the timing when the driven target clutch torque capacity and the driving target clutch torque capacity coincide with each other after a changeover from the accelerator OFF state to the accelerator ON state, the target clutch torque capacity is changed over from the driven target clutch torque capacity to the driving target clutch torque capacity, but the present disclosure is not limited thereto. The target clutch torque capacity may be changed over from the driven target clutch torque capacity to the driving target clutch torque capacity after a third predetermined time elapses from the timing when the driven target clutch torque capacity and the driving target clutch torque capacity coincide with each other. In this case, when the driven target clutch torque capacity and the driving target clutch torque capacity do not coincide with each other within the aforementioned first predetermined time after a changeover from the accelerator OFF state to the accelerator ON state, the driven target clutch torque capacity may be changed toward the driving target clutch torque capacity. After a fourth predetermined elapses from the timing when the changing driven target clutch torque capacity coincides with the driving target clutch torque capacity, the target clutch torque capacity for use in lockup clutch control may be changed over from the driven target clutch torque capacity to the driving target clutch torque capacity.

Besides, in the foregoing embodiment of the present disclosure, at the timing when the driving target clutch torque capacity and the driven target clutch torque capacity coincide with each other after a changeover from the accelerator ON state to the accelerator OFF state, the target clutch torque capacity is changed over from the driving target clutch torque capacity to the driven target clutch torque capacity, but the present disclosure is not limited thereto. The target clutch torque capacity may be changed over from the driving target clutch torque capacity to the driven target clutch torque capacity after a predetermined time elapses from the timing when the driving target clutch torque capacity and the driven target clutch torque capacity coincide with each other. In this case, when the driving target clutch torque capacity and the driven target clutch torque capacity do not coincide with each other within the aforementioned second predetermined time after a changeover from the accelerator ON state to the accelerator OFF state, the driving target clutch torque capacity may be changed toward the driven target clutch torque capacity. The target clutch torque capacity for use in lockup clutch control may be changed over from the driving target clutch torque capacity to the driven target clutch torque capacity after a predetermined time elapses from the timing when the changing driving target clutch torque capacity coincides with the driven target clutch torque capacity.

In the foregoing embodiment of the present disclosure, the lockup oil chamber 34 of the multiple plate lockup clutch 3 is arranged in the torque converter 2, but the present disclosure is not limited thereto. The present disclosure is also applicable to a control apparatus for a lockup clutch having a lockup oil chamber that is arranged outside a torque converter.

In the foregoing embodiment of the present disclosure, the example in which the present disclosure is applied to the control of the lockup clutch capable of controlling the differential state of the torque converter that is provided between the engine and the stepped (planetary gear-type) automatic transmission (the AT), in which the gear stage is set through the use of the frictional engagement devices such as the clutches, the brakes and the like and the planetary gear device, has been described, but the present disclosure is not limited thereto. The present disclosure is also applicable to the control of a lockup clutch capable of controlling the differential state of a torque converter that is provided between an engine and a continuously variable transmission (a CVT) that adjusts the speed ratio in a non-step manner.

In the foregoing embodiment of the present disclosure, the example in which the control apparatus according to the present disclosure is applied to the multiple plate lockup clutch that is mounted in the front-engine front-drive (FF) vehicle is presented, but the present disclosure is not limited thereto. The present disclosure is also applicable to a control apparatus for a lockup clutch that is mounted in a front-engine rear-drive (FR) vehicle or a four-wheel-drive vehicle.

The present disclosure can be effectively utilized to control a lockup clutch that is provided in a transmission for a vehicle.

What is claimed is:

1. A control apparatus for a lockup clutch that is provided in a transmission that is mounted in a vehicle, the control apparatus for the lockup clutch comprising:
   an electronic control unit that is configured to:
   calculate a driven target clutch torque capacity that is needed in a driven state where the transmission is driven from driving wheels of the vehicle, and a driving target clutch torque capacity that is needed in a driving state where the transmission drives the driving wheels of the vehicle,
   set a target clutch torque of the lockup clutch and control the lockup clutch, based on the driven target clutch torque capacity and the driving target clutch torque capacity,
   change over the target clutch torque capacity from the driven target clutch torque capacity to the driving target clutch torque capacity when the driven target clutch torque capacity and the driving target clutch torque capacity coincide with each other after an operation state of an accelerator of the vehicle changes over from an accelerator OFF state to an accelerator ON state, and
   change over the target clutch torque capacity from the driving target clutch torque capacity to the driven target clutch torque capacity when the driving target clutch torque capacity and the driven target clutch torque capacity coincide with each other after the operation state of the accelerator changes over from the accelerator ON state to the accelerator OFF state.

2. The control apparatus for the lockup clutch according to claim 1, wherein
   the electronic control unit is configured to start comparing the driven target clutch torque capacity and the driving target clutch torque capacity with each other after the operation state of the accelerator changes over from the accelerator OFF state to the accelerator ON state, and change over the target clutch torque capacity from the driven target clutch torque capacity to the driving target clutch torque capacity when the driven target clutch torque capacity and the driving target clutch torque capacity coincide with each other, and
   the electronic control unit is configured to start comparing the driving target clutch torque capacity and the driven target clutch torque capacity with each other after the operation state of the accelerator changes over from the accelerator ON state to the accelerator OFF state, and change over the target clutch torque capacity from the driving target clutch torque capacity to the driven target clutch torque capacity when the driving target clutch torque capacity and the driven target clutch torque capacity coincide with each other.

3. The control apparatus for the lockup clutch according to claim 1, wherein
   the electronic control unit is configured to calculate a driven target clutch torque capacity such that the driven target clutch torque capacity changes toward the driving target clutch torque capacity when the driven target clutch torque capacity and the driving target clutch torque capacity do not coincide with each other within a first predetermined time after the operation state of the accelerator changes over from the accelerator OFF state to the accelerator ON state, and
   the electronic control unit is configured to calculate a driving target clutch torque capacity such that the driving target clutch torque capacity changes toward the driven target clutch torque capacity when the driving target clutch torque capacity and the driven target clutch torque capacity do not coincide with each other within a second predetermined time after the operation state of the accelerator changes over from the accelerator ON state to the accelerator OFF state.

4. The control apparatus for the lockup clutch according to claim 1, wherein
   the electronic control unit is configured to change over the target clutch torque capacity from the driven target clutch torque capacity to the driving target clutch torque capacity after a third predetermined time elapses from a timing when the driven target clutch torque capacity and the driving target clutch torque capacity coincide with each other following a changeover in the operation state of the accelerator from the accelerator OFF state to the accelerator ON state, and
   the electronic control unit is configured to change over the target clutch torque capacity from the driving target clutch torque capacity to the driven target clutch torque capacity after a fourth predetermined time elapses from a timing when the driving target clutch torque capacity and the driven target clutch torque capacity coincide with each other following a changeover in the operation state of the accelerator from the accelerator ON state to the accelerator OFF state.

5. The control apparatus for the lockup clutch according to claim 1, wherein
   the electronic control unit is configured to determine that the operation state of the accelerator has been changed over from the accelerator OFF state to the accelerator ON state, and that the operation state of the accelerator has been changed over from the accelerator ON state to the accelerator OFF state,
   the electronic control unit is configured to start comparing the driven target clutch torque capacity and the driving target clutch torque capacity with each other after the electronic control unit is determined that the operation state of the accelerator has been changed over from the accelerator OFF state to the accelerator ON state, and change over the target clutch torque capacity from the driven target clutch torque capacity to the driving target clutch torque capacity when the driven target clutch torque capacity and the driving target clutch torque capacity coincide with each other, and
   the electronic control unit is configured to start comparing the driving target clutch torque capacity and the driven target clutch torque capacity with each other after the electronic control unit is determined that the operation state of the accelerator has been changed over from the accelerator ON state to the accelerator OFF state, and change over the target clutch torque capacity from the driving target clutch torque capacity to the driven target clutch torque capacity when the driving target clutch torque capacity and the driven target clutch torque capacity coincide with each other.

* * * * *